Sept. 4, 1962   Y. J. LAGSTROM   3,052,443
MANUAL SEAT ADJUSTER
Filed June 22, 1960   3 Sheets-Sheet 1
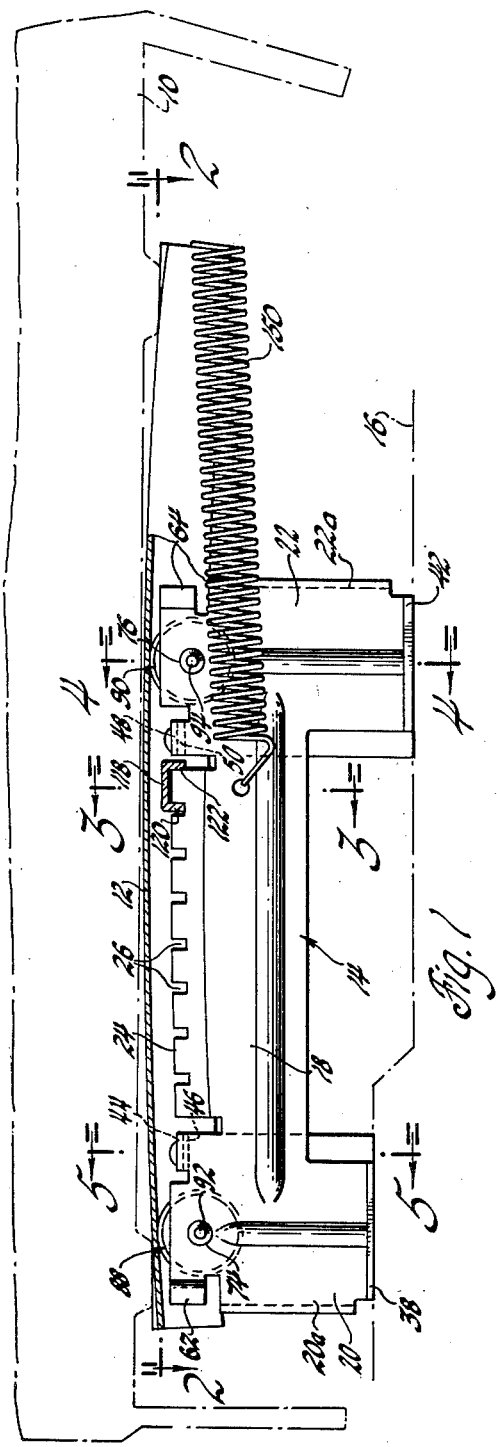
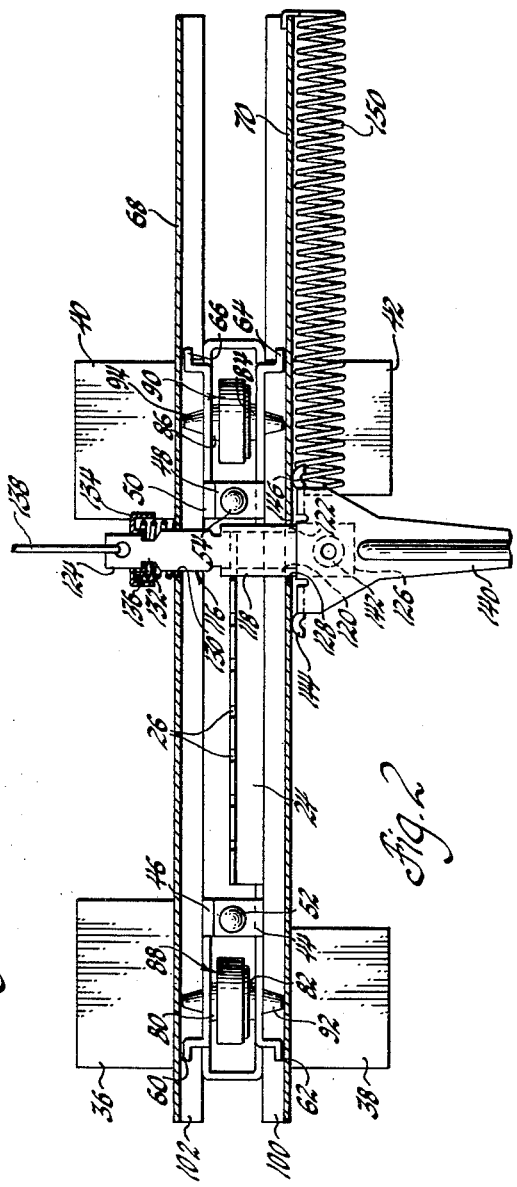
INVENTOR.
Yngve J. Lagstrom
BY
C. P. Barnard
ATTORNEY Sept. 4, 1962    Y. J. LAGSTROM    3,052,443
MANUAL SEAT ADJUSTER
Filed June 22, 1960    3 Sheets-Sheet 2

INVENTOR.
Yngve J. Lagstrom
BY
L. P. Barnard
ATTORNEY

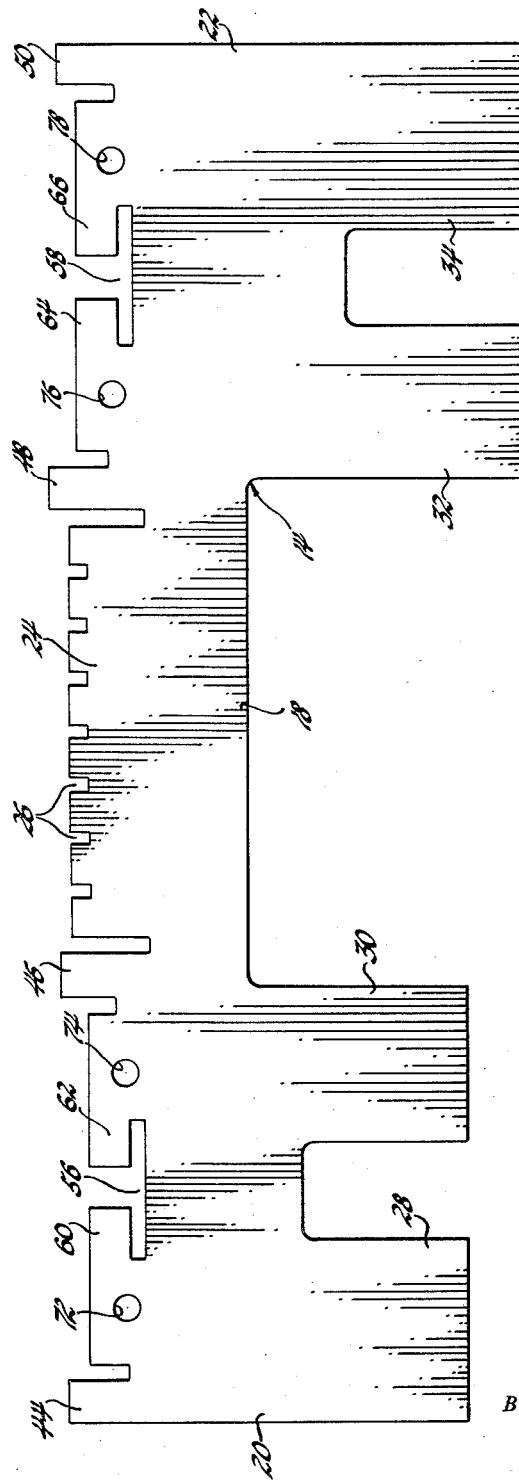

3,052,443
MANUAL SEAT ADJUSTER
Yngve J. Lagstrom, Trenton, N.J., assignor to General Motors Corporation, Detroit, Mich., a corporation of Delaware
Filed June 22, 1960, Ser. No. 37,943
14 Claims. (Cl. 248—430)

This invention relates to seat adjuster mechanism and more particularly to mechanism for adjustably positioning a vehicle seat.

An object of this invention is to form the main support member of a seat adjuster unit from a unitary sheet of metal. Another object of this invention is to provide an improved and simplified adjustable seat structure which is durable and reliable in use as well as being easy and convenient to operate. A further object of this invention is to provide adjuster mechanism for longitudinally positioning a vehicle seat and having locking means for holding the seat in a selected adjusted position without rattle or vibrational movement of the parts during operation of the vehicle. Another object of this invention is to provide improved roller means for shifting a vehicle seat relative to a support member with a minimum of play between the moving parts. Another important object of this invention is to integrate anti-rattle means with the slide mechanism of the adjuster unit, Still another object of this invention is to provide improved anti-rattle locking means.

Other objects and advantages will be apparent from the following detailed description and the accompanying drawings wherein:

FIGURE 1 is a side elevational view, partly in section, of an illustrative embodiment of the invention;

FIGURE 2 is a sectional view taken along the line 2—2 in FIGURE 1;

FIGURE 6 is a plan view of a pre-fabricated blank of a portion of the embodiment of FIGURE 1.

The present invention is particularly adapted for use with the front seat of an automobile having a suitable frame supported by spaced slide mechanisms located beneath the seat at each side thereof. Since the construction of each of the slide mechanisms is substantially identical, only one mechanism will be described in detail.

Figure 3:
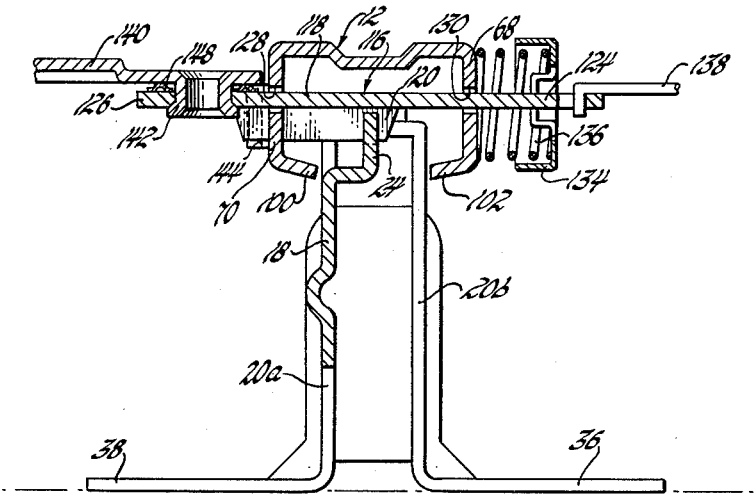
FIGURE 3 is a sectional view taken along the line 3—3 in FIGURE 1.
Figure 4:
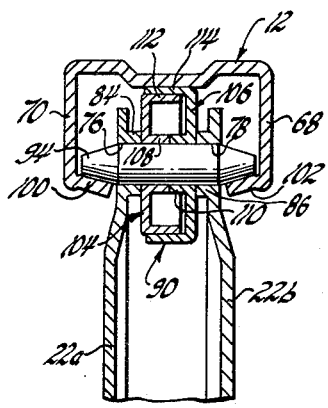
FIGURE 4 is a sectional view taken along the line 4—4 in FIGURE 1.
Figure 5:
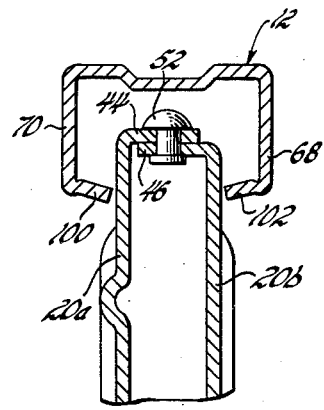
FIGURE 5 is a sectional view taken along the line 5—5 in FIGURE 1.

Referring now to the drawings, a seat frame 10 is fixedly supported by a channel member 12 that is slidably supported on a stationary support member 14 fixedly secured to the vehicle floor 16. The stationary support member 14 is formed from a unitary sheet metal blank having a blanked form, as shown in FIGURE 6, and comprises a central connecting portion 18 that links identically configured end portions 20, 22. A lock bar positioning section 24 is formed along the upper edge of the central connecting portion 18 by a plurality of regularly spaced notches 26 and is inwardly bent to a centrally located position in the assembled position as shown in FIGURES 2 and 3. Integral support legs 28, 30 are formed on the end portion 20 and have a different length than integral support legs 32, 34 formed on the end portion 22 to accommodate the configuration of the vehicle floor. The support legs are formed by reversely bending the end portions 20, 22 to provide spaced parallel surfaces 20a, 20b and 22a, 22b. The ends of the integral support legs are outwardly bent to form outwardly extending support flanges 36, 38 on the front end portion 20 and support flanges 40, 42 on the rear end portion 22. The support flanges are secured to the vehicle floor by any suitable fastening means. In order to rigidly secure the unitary stationary support member 14 in the assembled position, locking tabs 44, 46 are provided on the front end portion 20 and locking tabs 48, 50 are provided on the rear end portion 22. In the assembled position shown in FIGURES 2 and 5, the locking tabs overlap and are fastened together by rivets 52, 54 or other suitable fastening means. In the preformed blank the stationary support member is provided with T-shaped slots 56, 58 in each of the end portions 20, 22 which provide channel guide shoe extensions 60, 62, 64, 66 that are outwardly bent in the assembled form to frictionally engage the side flanges 67, 70 of the channel member 12 as shown in FIGURE 2. The stationary support member is provided with axially aligned apertures 72, 74 in the front end portion and axially aligned apertures 76, 78 in the rear end portion. The aligned apertures are provided with concentric, inwardly extending bosses 80, 82, 84, 86 that rotatably space roller members 88, 90 that are rotatably supported on pin members 92, 94 rotatably received in the aligned apertures. Referring now to FIGURE 4, the ends of the pin members 96, 98 are tapered and adapted for frictional engagement with inwardly bent end portions 100, 102 of the channel member 12 to provide support therefor and, in combination with the roller member 88, 90, form an anti-rattle interference fit to prevent slippage and reduce rattle. The roller members 88, 90 are of simple, improved construction comprising nested annular stampings 104, 106 having abutting hub portions 108, 110 and having overlapping rim portions 112, 114 to provide a rigid channel supporting surface.

Improved latch means are provided for locking the seat in adjusted position and include a locking bar 116 having a channel section 118 formed by downwardly depending side portions 120, 122 that are correspondingly spaced with the regularly spaced notches 26 as shown in FIGURE 1. The width of the side surfaces 120, 122 is slightly less than the width of the notches 26 so that the lock bar is adapted to slide relative to the locking channel 24. The outer ends 124, 126 of the locking bar 116 are formed in flat sections which extend outwardly of the channel member 12 through slots 128, 130 provided in the side surfaces 68, 70 of the channel member. Referring now to FIGURES 2 and 3, seat 132 is provided on the flat section 124 to secure a locking cap 134 to the locking bar. A compression spring 136 is seated on the locking cap 134 and against the adjacent side surface 68 of the channel member 12. The outermost portion of the flat section 124 is connected to a control rod 138 that extends to a similar right-hand seat adjuster and is controllably engaged with a similar right-hand locking bar (not shown). A locking bar handle 140 is rotatably secured to the flat section 126 by a boss portion 142 and is provided with cam shoes 144, 146 engaged with the side surface 70 of the channel member 12 to force the locking bar outwardly against the compression spring 136 as the handle 140 is pivoted relative to the locking bar. A stop 142 extends between the spaced channel slides 120, 122 of the locking bar to limit movement of the locking bar and to additionally laterally support the channel side. An anti-rattle spring washer 148 is a positioned between the lock bar handle 140 and the locking bar 116 and a tension assist spring 150 is fixed to the rear end of the channel member 12 and to the central portion 18 of the stationary support member.

In operation, the seat frame 10 may be horizontally adjusted the length of the locking notch rail 24 by sliding movement of the channel member 12 on the roller members 88, 90 and in cooperation with the tapered ends of the pin members 92, 94 and the guide shoes 60, 62, 64, 66. The coaction of the parts and the interference fit maintained between the channel member and the rotatable pin members and associated roller members prevents slippage and greatly reduces rattle of the parts. The mechanism is adjusted by pulling the locking bar handle 140 forwardly or rearwardly about the cam shoes 144, 146 and the pivotal connection with the locking bar 116 to slide the locking bar channel 18 clear of the notches 26 against the bias of the compression spring 136. When the downwardly depending side surfaces 120, 122 are disengaged from the notches, the seat may be adjusted as desired and, in the adjusted position, the handle may be released so that the compression spring 136 will pull the locking bar side flanges 120, 122 into locking engagement with the adjacent notches 26. Actuation of the locking bar handle similarly actuates the locking bar associated with the other adjuster unit through the control rod 138.

It is to be understood that the invention is not intended to be limited in its application to the exact details of construction and arrangement of the parts as illustrated in the accompanying drawings since the invention is capable of other embodiments and of being practiced or carried out in various ways. It is, therefore, comprehended that various modifications may be made within the scope of this invention except as limited by the prior art and as defined by the appended claims.

I claim:

1. Seat adjuster mechanism comprising a unitary stationary support member having end portions spaced by a central connecting portion, support brackets integrally formed on each of said end portions of said support member, locking means integrally formed on said central portion of said support member, roller support means integrally formed on each of said end portions of said support member, roller means rotatably mounted on each of said support means, a channel support movably supported on said roller means, a seat frame fixed to said channel support, and locking control means slidably mounted in said channel support and slidably engageable with said locking means to variably position said seat frame.

2. Seat adjusting mechanism comprising spaced adjuster units to adjustably support a seat frame, each unit comprising: a channel member supporting said seat frame, a unitary stationary support member having end portions interconnected by a central connecting plate, a plurality of locking notches formed along said central connecting plate, downwardly depending support arms integrally formed on said end portions, outwardly extending support flanges integrally formed on the ends of said support arms, fastener means to secure said support flanges to a vehicle floor, guide shoes extending outwardly from said end portions and being frictionally engaged with said channel member, bearing means provided in each end portion, a pin member rotatably supported in each of said bearing means, a roller member rotatably supported on each pin member, said channel member being movably supported on said roller members, a seat formed along each side of said channel member by inwardly bent portions thereof, the end portions of said pin members being contoured for rolling frictional engagement with said seat, a locking bar, a channel portion on said locking bar dimensioned for sliding engagement with said locking notches, slot means on each side of said channel member aligned with said locking notches and slidably supporting said locking bar, a compression spring seated on one end of said locking bar and on said channel member, a control handle pivotally fixed to the other end of said locking bar, and cam shoes provided on said handle and engageable with said channel member whereby said locking bar may be disengaged from said locking notches against the bias of said compression spring to variably position said seat frame.

3. Seat adjusting apparatus comprising a unitary stationary support member having end portions interconnected by a central elongated portion, a plurality of locking notches formed along said central elongated portion, each of said end portions being reversely bent to form parallel spaced support legs, the extremities of said support legs being outwardly bent to form support flanges, aligned tab members provided on each of said support legs and being inwardly bent in overlapping relationship, fastener means rigidly securing said tab members in the overlapping relationship to rigidly space said support legs, oppositely spaced portions of said support legs being outwardly bent to form channel guide means, said end portions having concentrically aligned pin support means in the reversely bent portions, roller means rotatably mounted in said pin support means, a channel support movably supported on said roller means and slidably engaged with said channel guide means, a seat frame fixed to said channel support, and locking control means associated with said channel support and engageable with said locking means to variably position said seat frame.

4. An adjuster unit for variably positioning a vehicle seat frame and comprising a unitary stationary support member, support brackets integrally formed on each end of said support member, locking means integrally formed on the central portion of said support member, roller support means integrally formed on each end of said support member, pin members rotatably supported in each of said roller support means, roller members rotatably mounted on each of said pin members, said roller members being formed from nested disk members, each disk member having abutting hub portions rotatably supported on said pin member and having overlapping rim portions, a channel support movably supported on said roller members, side portions of said channel support being inwardly bent to form pin engaging surfaces, the end portions of said pin members being frictionally engaged with said pin engaging surfaces of said channel support, and locking control means associated with said channel support and engageable with said locking means to variably position said seat frame.

5. A seat adjuster unit having relatively movable seat support means comprising a seat frame supporting channel and a support member having roller means to slidably support said channel member, said support member being formed from a unitary sheet metal blank and comprising in assembled form: end portions spaced by a central connecting portion, each of said end portions being reversely bent to form spaced parallel support flanges, connecting means to secure said spaced parallel support flanges in a spaced parallel position, bearing means formed in each end portion, and being adapted to receive spaced pin members, boss portions extending out from said bearing means and being adapted to abut and space said roller means on said pin members, and guide shoes extending outwardly from said end portions and being positioned in abutting engagement with said supporting channel to provide anti-rattle means for said seat adjuster unit.

6. The seat adjuster unit as defined in claim 5 and having locking means formed on said central connecting portion and being adapted to cooperably engage locking means associated with said channel member to control relative movement between said channel member and said support member.

7. A seat adjuster unit having relatively movable seat supporting means comprising a channel member and a support member having roller means to slidably support said channel member, and comprising: locking rack means fixed to one of said seat upport means, a locking bar slidably supported by the other of said seat support means and being movable relative thereto from a position of locking engagement with said rack means to an unlocked position permitting relative movement between said seat support means, spring means biasing said locking bar to the position of locking engagement, a control handle pivotally secured to said locking bar, said control handle being provided with cam portions in abutting engagement with said other of said seat support means, and said control handle being pivotally movable about said cam portions to move said locking bar from said position of locking engagement to said unlocked position against the bias of said spring means.

8. A seat adjuster unit having relatively movable seat support means comprising a seat supporting channel and a support member having roller means to slidably support said seat supporting channel, and comprising: locking means fixed to one of said seat support means, said locking means comprising a plurality of spaced notches provided thereon, a locking bar slidably supported by the other of said seat support means, said locking bar having a channeled portion adapted to be received within said notches and being movable from a position of locking engagement with said locking means to an unlocked position permitting relative movement between said seat support means, spring means biasing said locking bar to the position of locking engagement, a control handle pivotally secured to said locking bar, said control handle being provided with cam portions in abutting engagement with said other of said seat support means, and said control handle being pivotally movable about said cam portions to move said locking bar from said position of locking engagement to said unlocked position against the bias of said spring means.

9. A seat adjuster unit having relatively movable supporting means comprising a channel member and a support member, and comprising: roller means provided on said support member and slidably supporting said channel member, pin means supported by said support member and rotatably supporting said roller means in frictional engagement with said channel member, seat means formed on said channel member, end portions of said pin means being frictionally engaged with said seat means, guide shoe means provided on said support member and being frictionally engaged with said channel member, and the frictional engagement between said pin means and said seat means and between said shoe means and said channel member and between said roller means and said channel member providing anti-rattle means for said seat adjuster unit.

10. A seat adjuster unit having relatively movable seat supporting means comprising a channel member and a support member, and comprising: roller means provided on said support member and slidably supporting said channel member, pin means supported by said support member and rotatably supporting said roller means in frictional engagement with said channel member, seat means formed on said channel member, end portions of said pin means being frictionally engaged with said seat means, and the frictional engagement between said pin means and said seat means and between said roller means and said channel member providing anti-rattle means for said seat adjuster unit.

11. A seat adjusting mechanism comprising a seat frame supporting channel member, a unitary stationary support member having end portions interconnected by a central connecting plate, a plurality of locking notches formed along said central connecting plate, downwardly depending support arms integrally formed on said end portions, outwardly extending support flanges integrally formed on the ends of said support arms, faster means to secure said support flanges to a vehicle floor, bearing means provided in each end portion, pin means rotatably supported in each of said bearing means, roller means rotatably supported on each pin means, said channel member being movably supported on said roller means, a locking bar, a channel portion on said locking bar dimensioned for sliding engagement with said locking notches, slot means on each side of said channel member aligned with said locking notches and slidably supporting said locking bar, a compression spring seated on one end of said locking bar and on said channel member, a control handle pivotally fixed to the other end of said locking bar, and cam shoes provided on said handle and engageable with said channel member whereby said locking bar may be disengaged from said locking notches against the bias of said compression spring to variably position said seat frame.

12. A seat adjusting mechanism to adjustably support a seat frame comprising: a channel member supporting said seat frame, a unitary stationary support member having end portions interconnected by a central connecting plate, a plurality of locking notches formed along said central connecting plate, downwardly depending support arms integrally formed on said end portions, outwardly extending support flanges integrally formed on the ends of said support arms, fastener means to secure said support flanges to a vehicle floor, guide shoes extending outwardly from said end portions and being frictionally engaged with said channel member, bearing means provided in each end portion, a pin member rotatably supported in each of said bearing means, a roller member rotatably supported on each pin member, said channel member being movably supported on the roller members, a seat formed along each side of said channel member by downwardly and inwardly bent portions thereof, and the end portions of said pin members being tapered for rolling frictional engagement with said seat.

13. Seat adjusting apparatus comprising a unitary stationary support member having end portions interconnected by a central elongated portion, a plurality of locking notches formed along said central elongated portions, each of said end portions being reversely bent to form parallel spaced support legs, the extremities of said support legs being outwardly bent to form support flanges, aligned tab members provided on each of said support legs and being inwardly bent in overlapping relationship, fastener means rigidly securing said tab members in the overlapping relationship to rigidly space said support legs, said end portions having concentrically aligned pin support means in the reversely bent portions, roller means rotatably mounted on said pin support means, a channel support movably suppotred on said roller means, a seat frame fixed to said channel support, and locking control means associated with said channel support and engageable with said locking means to variably position said seat frame.

14. A seat adjuster unit having relatively movable seat support means comprising a seat frame supporting channel and a support member having roller means to slidably support said channel member, said support member being formed from a unitary sheet metal blank and comprising in assembled form: end portions spaced by a central connecting portion, each of said end portions being reversely bent to form spaced parallel support flanges, connecting means to secure said spaced parallel support flanges in a spaced parallel position, bearing means formed in each end portion and being adapted to receive spaced pin members, and boss portions extending out from said bearing means and being adapted to abut and space said roller means on said pin members.

References Cited in the file of this patent

UNITED STATES PATENTS

| | | |
|---|---|---|
| 859,099 | Nice | July 2, 1907 |
| 2,127,610 | Moore | Aug. 23, 1938 |
| 2,336,433 | Woina | Dec. 7, 1943 |
| 2,383,195 | Horman | Aug. 21, 1945 |
| 2,798,532 | Clark | July 9, 1957 |
| 2,951,527 | Wassilieff | Sept. 6, 1960 |